United States Patent
Chien

(10) Patent No.: US 12,539,939 B2
(45) Date of Patent: Feb. 3, 2026

(54) TRANSMISSION DEVICE FOR BICYCLE

(71) Applicant: Sun Race Sturmey-Archer Inc., Taoyuan (TW)

(72) Inventor: Shou-Chiang Chien, Taoyuan (TW)

(73) Assignee: SUN RACE STURMEY-ARCHER INC., Taoyuan (TW)

( * ) Notice: Subject to any disclaimer, the term of this patent is extended or adjusted under 35 U.S.C. 154(b) by 12 days.

(21) Appl. No.: 18/906,190

(22) Filed: Oct. 4, 2024

(65) Prior Publication Data

US 2025/0115330 A1 Apr. 10, 2025

(30) Foreign Application Priority Data

Oct. 6, 2023 (TW) ................................. 112138395

(51) Int. Cl.
*B62M 9/12* (2006.01)
(52) U.S. Cl.
CPC ..................................... *B62M 9/12* (2013.01)
(58) Field of Classification Search
CPC .................................. B62M 9/10; B62M 9/12
USPC ....................................................... 474/160
See application file for complete search history.

(56) References Cited

U.S. PATENT DOCUMENTS

| | | | | | |
|---|---|---|---|---|---|
| 4,121,474 | A * | 10/1978 | Arregui Suinaga | .... | F16D 41/30 474/160 |
| 4,869,710 | A * | 9/1989 | Iwasaki | .......... | F16D 41/30 474/160 |
| 6,102,821 | A * | 8/2000 | Nakamura | .......... | B62M 9/10 474/160 |
| 6,264,575 | B1 * | 7/2001 | Lim | .......... | F16D 41/30 192/64 |
| 6,382,381 | B1 * | 5/2002 | Okajima | .......... | B60B 1/042 192/64 |
| 6,428,437 | B1 * | 8/2002 | Schlanger | .......... | B62M 9/10 474/160 |
| 6,488,603 | B2 * | 12/2002 | Lim | .......... | B62M 9/10 192/64 |
| 8,696,503 | B2 * | 4/2014 | Oishi | .......... | B62M 9/121 474/160 |
| 8,764,594 | B2 * | 7/2014 | Dal | .......... | B62M 9/10 474/160 |
| 8,905,878 | B2 * | 12/2014 | Loy | .......... | B62M 9/10 474/160 |
| 8,956,254 | B2 * | 2/2015 | Tokuyama | .......... | B62M 9/12 474/160 |
| 8,968,130 | B2 * | 3/2015 | Liao | .......... | B62M 9/10 474/160 |
| 9,446,815 | B2 * | 9/2016 | Lin | .......... | B62M 9/10 |
| 9,533,735 | B2 * | 1/2017 | Braedt | .......... | F16H 9/24 |
| 9,550,547 | B2 * | 1/2017 | Valle | .......... | B62M 9/105 |

(Continued)

FOREIGN PATENT DOCUMENTS

TW 590955 B 6/2004

*Primary Examiner* — Henry Y Liu
(74) *Attorney, Agent, or Firm* — WPAT, PC

(57) ABSTRACT

A transmission device for bicycle comprises a sprockets cluster, a second sprocket and a lock ring. The sprockets cluster has plural sprockets, one of the sprockets is a first sprocket, which has a first sprocket teeth, a protrusion of first sprocket and plural splines of first sprocket. The second sprocket has a second sprocket teeth, a protrusion of second sprocket, plural splines on second sprocket, and an opening of second sprocket. The lock ring is disposed in the opening of second sprocket.

13 Claims, 9 Drawing Sheets

(56) References Cited

U.S. PATENT DOCUMENTS

| | | | | |
|---|---|---|---|---|
| 9,868,491 B1* | 1/2018 | Oishi | ................... | B62M 9/10 |
| 9,994,285 B2* | 6/2018 | Tokuyama | ............... | F16H 55/30 |
| 10,093,388 B2* | 10/2018 | Kamada | ................... | B62M 9/10 |
| 10,112,681 B2* | 10/2018 | Oishi | ................... | B62M 9/10 |
| 10,625,820 B2* | 4/2020 | Emura | ................... | B62M 9/12 |
| 10,717,495 B2* | 7/2020 | Fukunaga | ............... | F16H 55/30 |
| 10,889,353 B2* | 1/2021 | Emura | ................... | F16H 55/30 |
| 11,072,203 B2* | 7/2021 | Bots | ................... | F16D 1/10 |
| 11,603,166 B2* | 3/2023 | Fujita | ................... | F16H 55/30 |
| 11,655,003 B2* | 5/2023 | Emura | ................... | F16H 55/06 474/160 |
| 11,767,080 B1* | 9/2023 | Fujita | ................... | B60B 27/04 474/160 |
| 11,858,588 B2* | 1/2024 | Fujita | ................... | B62M 9/10 |
| 12,179,882 B2* | 12/2024 | Fujita | ................... | B62M 9/10 |
| 12,187,384 B2* | 1/2025 | Fujita | ................... | F16H 55/30 |
| 2001/0039224 A1* | 11/2001 | Lim | ................... | B62M 9/10 474/158 |
| 2004/0142782 A1* | 7/2004 | Kamada | ................... | B62M 9/10 474/160 |
| 2006/0058140 A1* | 3/2006 | Nakano | ................... | B62M 9/10 474/152 |
| 2008/0004143 A1* | 1/2008 | Kanehisa | ................... | B62M 9/10 474/160 |
| 2008/0188336 A1* | 8/2008 | Tokuyama | ............... | B62M 9/10 474/160 |
| 2009/0042679 A1* | 2/2009 | Valle | ................... | B62M 9/10 474/160 |
| 2009/0042681 A1* | 2/2009 | Dal Pra' | ................... | B62M 9/10 474/160 |
| 2009/0042682 A1* | 2/2009 | Dal Pra' | ................... | F16H 55/30 474/160 |
| 2009/0191996 A1* | 7/2009 | D'Aluisio | ................ | B62M 9/12 192/64 |
| 2009/0215566 A1* | 8/2009 | Braedt | ................... | B62M 9/10 29/893.1 |
| 2009/0243250 A1* | 10/2009 | Chiang | ................... | B62M 9/10 280/260 |
| 2010/0009794 A1* | 1/2010 | Chiang | ................... | B62M 9/10 474/160 |
| 2010/0099530 A1* | 4/2010 | Chiang | ................... | B62M 9/10 474/160 |
| 2011/0092327 A1* | 4/2011 | Oishi | ................... | B62M 9/10 474/160 |
| 2012/0225745 A1* | 9/2012 | Oishi | ................... | B62M 9/125 474/160 |
| 2013/0035183 A1* | 2/2013 | Tokuyama | ............... | B62M 9/10 474/78 |
| 2015/0024884 A1* | 1/2015 | Braedt | ................... | F16H 9/24 474/78 |
| 2015/0133249 A1* | 5/2015 | Tsai | ................... | B62M 9/12 474/160 |
| 2016/0083045 A1* | 3/2016 | Lin | ................... | F16H 55/30 474/160 |
| 2017/0043840 A1* | 2/2017 | Reinbold | ................ | F16H 55/30 |
| 2017/0361901 A1* | 12/2017 | Tokuyama | ............... | F16H 55/30 |
| 2017/0369124 A1* | 12/2017 | Kamada | ................... | F16H 55/30 |
| 2018/0009505 A1* | 1/2018 | Kamada | ................... | F16H 55/30 |
| 2018/0022415 A1* | 1/2018 | Oishi | ................... | B62M 9/10 474/160 |
| 2018/0194431 A1* | 7/2018 | Iwai | ................... | F16H 55/06 |
| 2019/0061875 A1* | 2/2019 | Reineke | ................... | B62M 9/132 |
| 2019/0084647 A1* | 3/2019 | Fukunaga | ............... | F16H 55/30 |
| 2019/0092425 A1* | 3/2019 | Fujita | ................... | B62M 9/10 |
| 2019/0092427 A1* | 3/2019 | Oka | ................... | B60B 27/047 |
| 2019/0225301 A1* | 7/2019 | Emura | ................... | F16H 55/30 |
| 2019/0225302 A1* | 7/2019 | Emura | ................... | F16H 55/30 |
| 2019/0359284 A1* | 11/2019 | Fukunaga | ............... | F16H 55/30 |
| 2019/0359285 A1* | 11/2019 | Emura | ................... | B62M 9/10 |
| 2020/0011408 A1* | 1/2020 | Yamazaki | ............... | B62M 9/10 |
| 2020/0062033 A1* | 2/2020 | Bots | ................... | F16D 1/10 |
| 2020/0239106 A1* | 7/2020 | Fukunaga | ............... | F16H 55/30 |
| 2020/0269953 A1* | 8/2020 | Fukunaga | ............... | F16H 55/30 |
| 2020/0300307 A1* | 9/2020 | Oka | ................... | F16D 3/06 |
| 2021/0171155 A1* | 6/2021 | Fukumori | ............... | B62M 9/10 |
| 2022/0258833 A1* | 8/2022 | Li | ................... | B62M 9/10 |
| 2022/0348286 A1* | 11/2022 | Fujita | ................... | B62M 9/10 |
| 2022/0348287 A1* | 11/2022 | Fujita | ................... | B62M 9/125 |
| 2024/0092455 A1* | 3/2024 | Fujita | ................... | B62M 9/10 |

* cited by examiner

TRANSMISSION DEVICE FOR BICYCLE

CROSS REFERENCE TO RELATED APPLICATION

This application claims the benefits of Taiwan application Serial No. 112138395, filed on Oct. 6, 2023, the disclosures of which are incorporated by references herein in its entirety.

TECHNICAL FIELD

The present disclosure generally relates to a transmission device for bicycle.

BACKGROUND

A bicycle is usually equipped with a hub transmission system, which is installed on the rear wheel of the bicycle and allows a rider to choose different gear ratios for adjusting different pedaling forces. Traditionally, the hub transmission system has a hub axle mounted on the bicycle frame. The hub axle rotatably supports the drive components, in order to transmit pedaling forces to the hub transmission system by means of the sprockets and chains.

In prior arts, U.S. Patent No. U.S. Pat. No. 10,889,353 discloses a bicycle rear sprocket assembly, that comprises a plurality of sprockets and a sprocket carrier configured to support at least one of the plurality of sprockets. The sprocket carrier has a plurality of spline teeth and a circumferentially extending non-splined portion, wherein the middle of the spline teeth of the first sprocket has a through hole, and the through hole extends to form a flange, which is a non-through structure. In addition, a patent, which number is TW 590955B, discloses a bicycle sprockets assembly, and has a sprocket portion with a plurality of radial extending teeth, and the spline of the first sprocket is a non-through structure as well. These non-through structures are more difficult to manufacture and practically require high-tonnage extrusion forging to produce. This process places high demands on the material of the parts, the strength of the molds, and the machine capabilities, leading to an increase in costs.

Therefore, how to improve the aforesaid transmission device for bicycle for avoiding above hard issues becomes an important issue for people skilled in the art.

SUMMARY

The present invention provides a transmission device for bicycle, more particularly to a new type of assembly structure, in order to reduce manufacturing complexity and production costs.

An embodiment of the present invention is a transmission device for bicycle, which comprises a sprockets cluster, a second sprocket and a lock ring. The sprockets cluster has a plurality of sprockets, wherein one of the sprockets is a first sprocket, the first sprocket has a first sprocket teeth, a protrusion of first sprocket and a plurality of splines of first sprocket, the splines of first sprocket are a plurality of troughs on an inner surface of the protrusion of first sprocket, and the spline of first sprocket is through the first sprocket teeth along an axial direction, the protrusion of first sprocket protrudes from one side of the first sprocket teeth. The second sprocket has a second sprocket teeth, a protrusion of second sprocket, a plurality of splines on second sprocket, and an opening of second sprocket, wherein the protrusion of second sprocket protrudes from one side of the second sprocket teeth, the splines on second sprocket are a plurality of bumps on an external surface of the protrusion of second sprocket, the opening of second sprocket is a through hole to form an inner surface of the protrusion of second sprocket, the spline on second sprocket is disposed in the spline of first sprocket, in order to assemble the second sprocket on the first sprocket. The lock ring is disposed in the opening of second sprocket.

As a conclusion, the present invention discloses the features as following. The spline on second sprocket of the second sprocket is disposed in the spline of first sprocket of the first sprocket, in order to assemble the second sprocket with the first sprocket. Continuously, the lock ring is disposed in the opening of second sprocket of the second sprocket, so as to fabricate the transmission device for bicycle. Compared with prior arts, the present invention provides a new type of assembly structure, the spline of the first sprocket of the first sprocket is a penetrating structure. In this way, the manufacturing complexity is thus reduced, and the need for high-tonnage extrusion forging is eliminated as well. The high requirements of the parts, mold strength, and machine capability may not be necessary to produce the spline of first sprocket, thereby further reducing production costs.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRA WINGS

The present disclosure will become more fully understood from the detailed description given herein below and the accompanying drawings which are given by way of illustration only, and thus are not limitative of the present disclosure and wherein.

DETAILED DESCRIPTION

Figure 1:
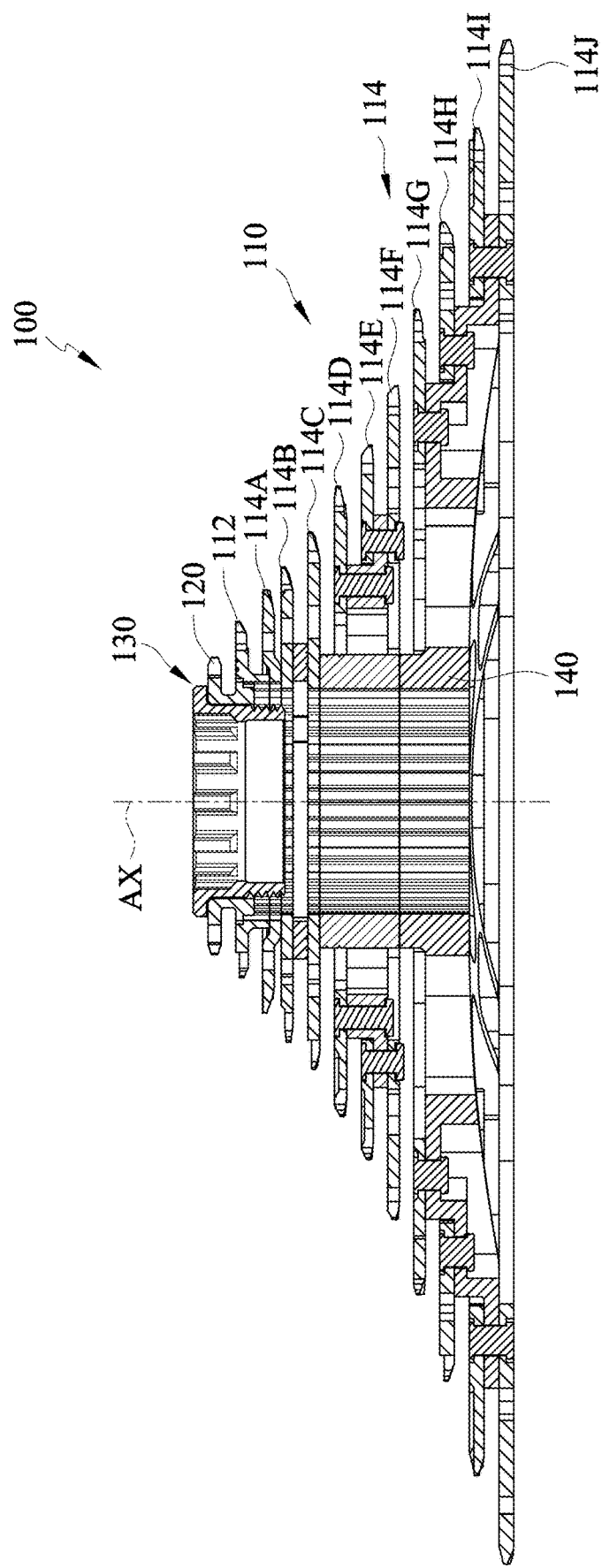
FIG. 1 illustrates a schematic combination view of a transmission device for bicycle of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The terms "including", "comprising", "having" and the like mentioned in this disclosure are all open terms; i.e., implying only "including but not limited to".

In the description of embodiments, when terms such as "first", "second", "third", "fourth" etc. are used to describe elements, they are only used to distinguish these elements from each other, but not limit order or importance of any of these elements.

In the descriptions of various embodiments, the so-called "coupling" or "connection" may refer to two or a plurality of components making physical or electrical contact directly or indirectly with each other, or refer to the mutual operation or action of two or a plurality of elements.

Figure 2:
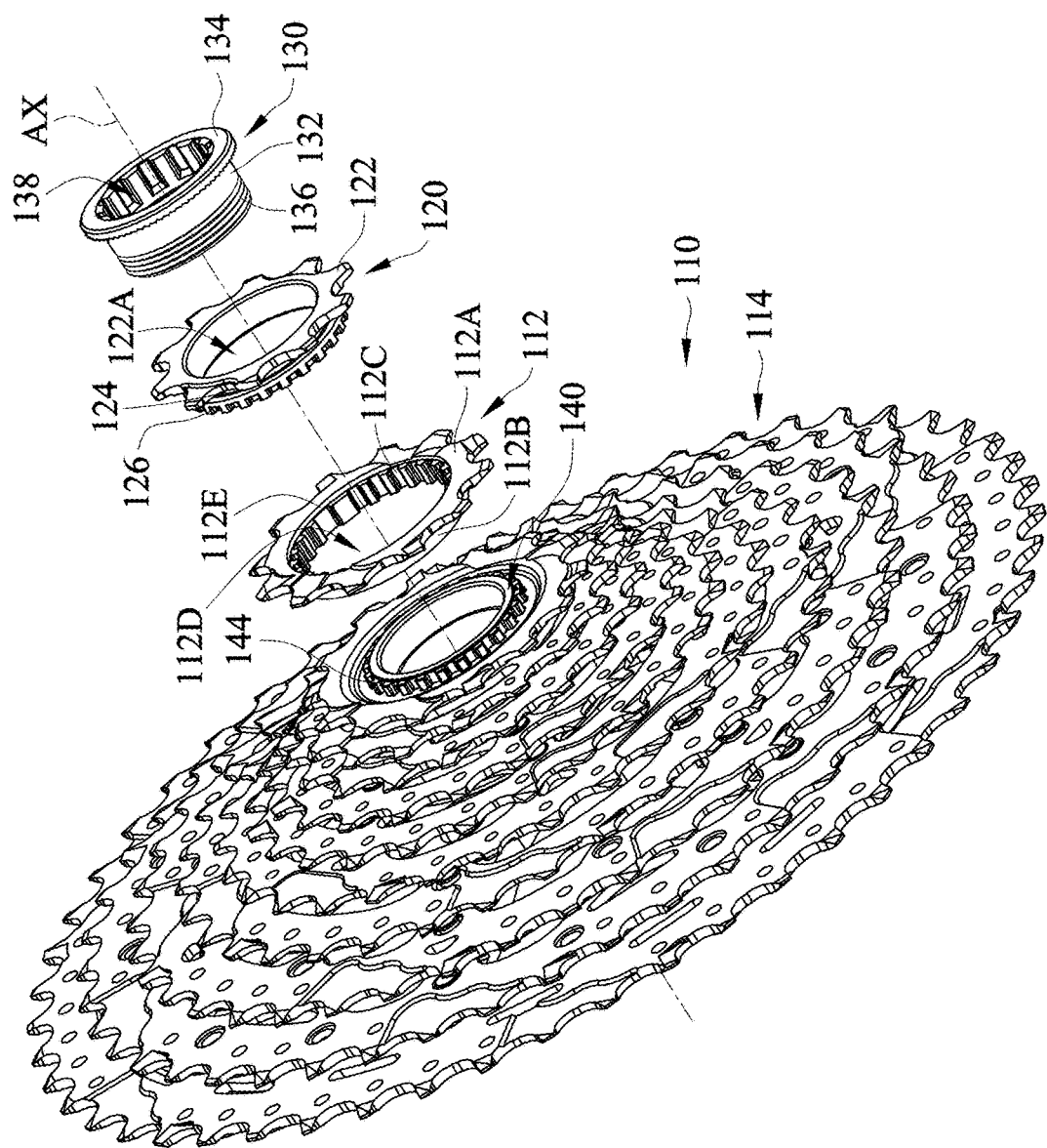
FIG. 2 illustrates a partial exploded view of the transmission device for bicycle of the present invention.
Figure 3:
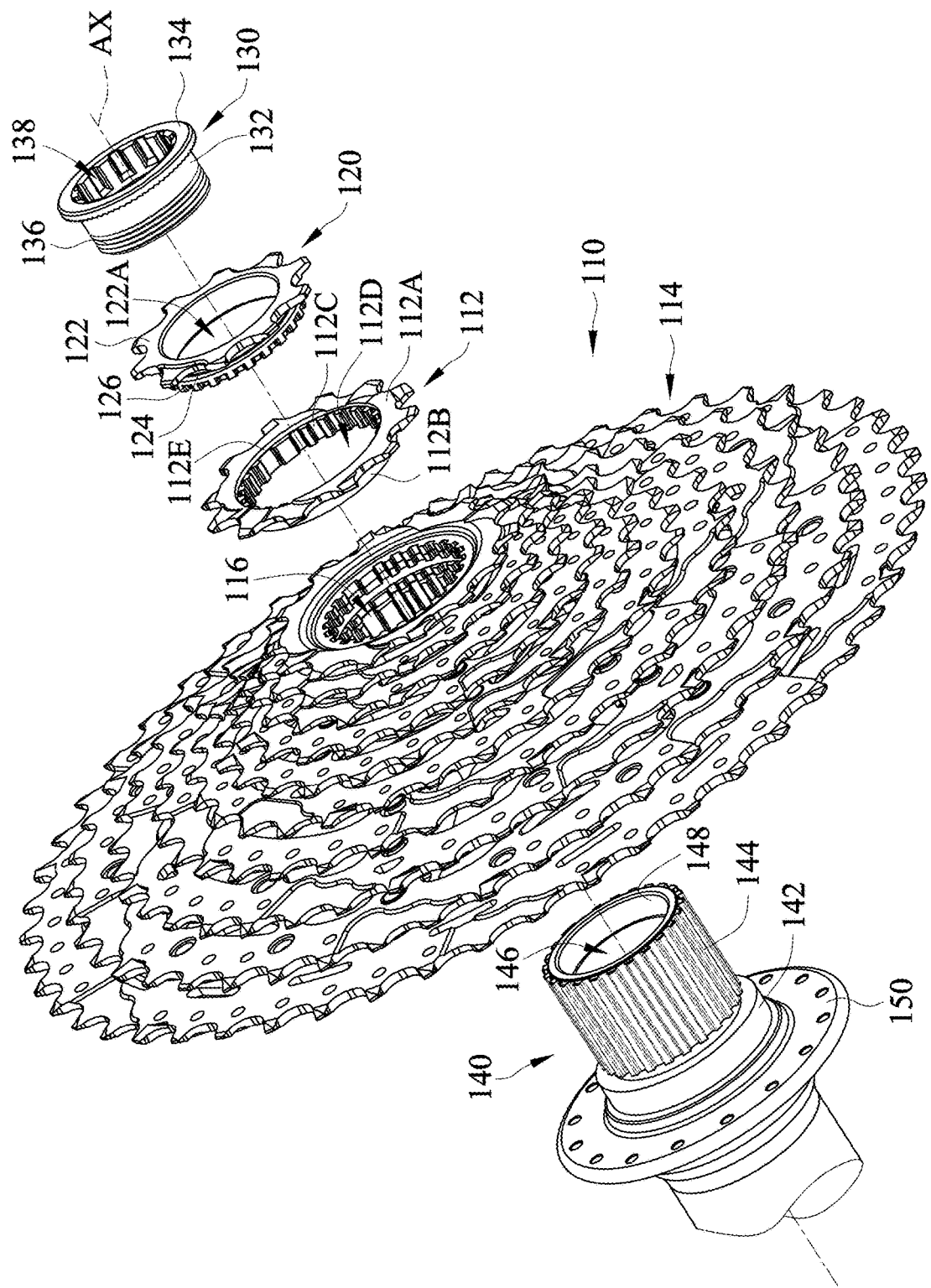
FIG. 3 illustrates an exploded view of the transmission device for bicycle of the present invention.
Figure 4:
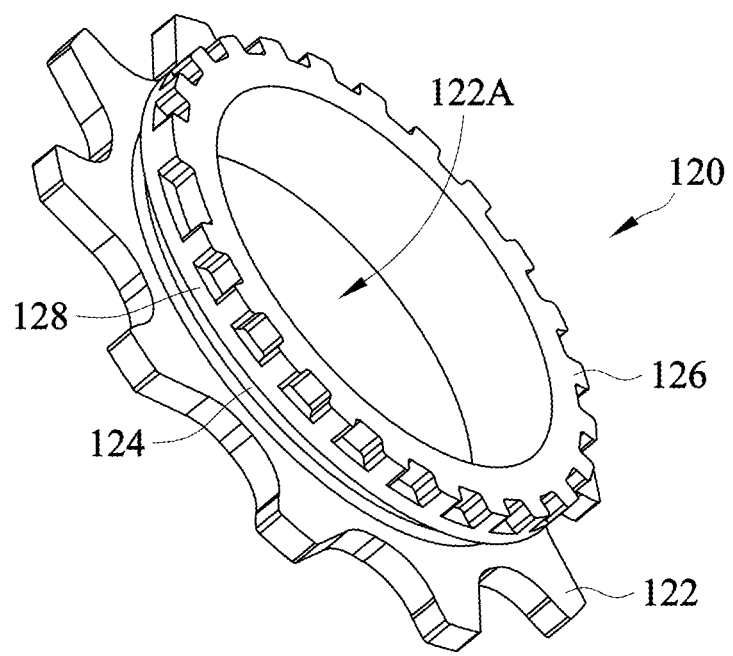
FIG. 4 illustrates a schematic view of a second sprocket of the present invention.
Figure 5:
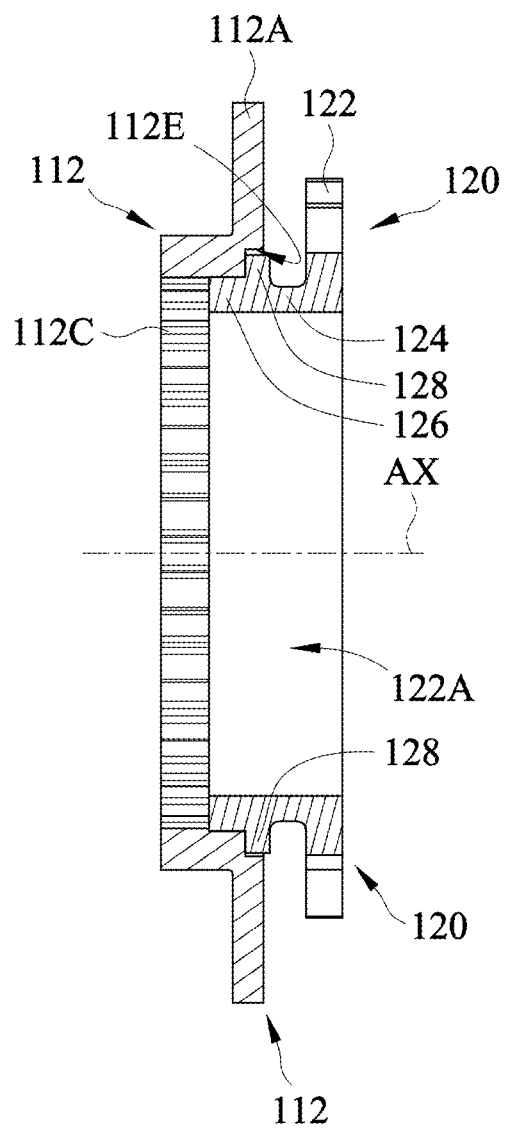
FIG. 5 illustrates a schematic cross-sectional view of the first sprocket combined with the second sprocket of the present disclosure.
Figure 6:
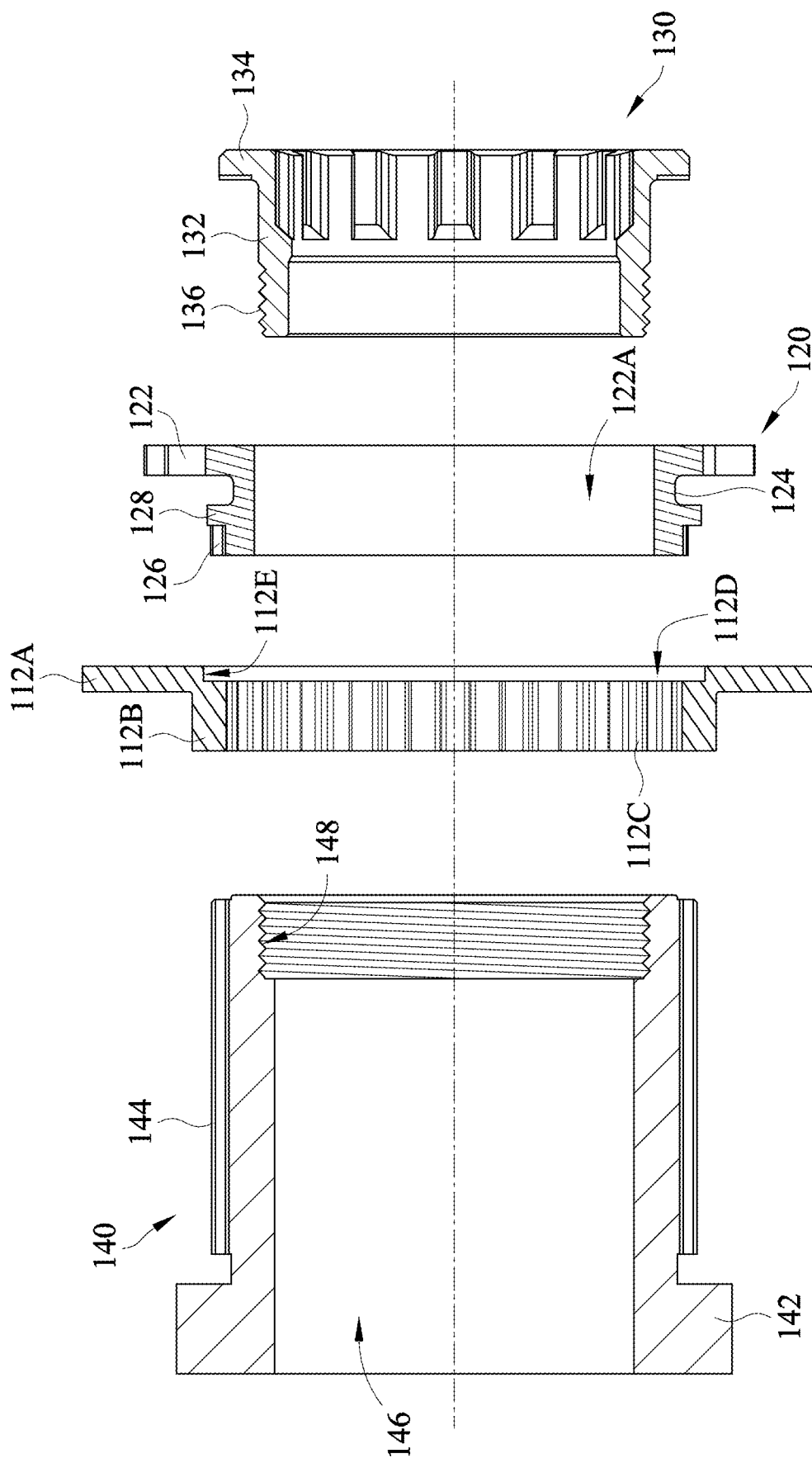
FIG. 6 illustrates a schematic cross-sectional exploded view of partial components of the transmission device for bicycle.
Figure 7:
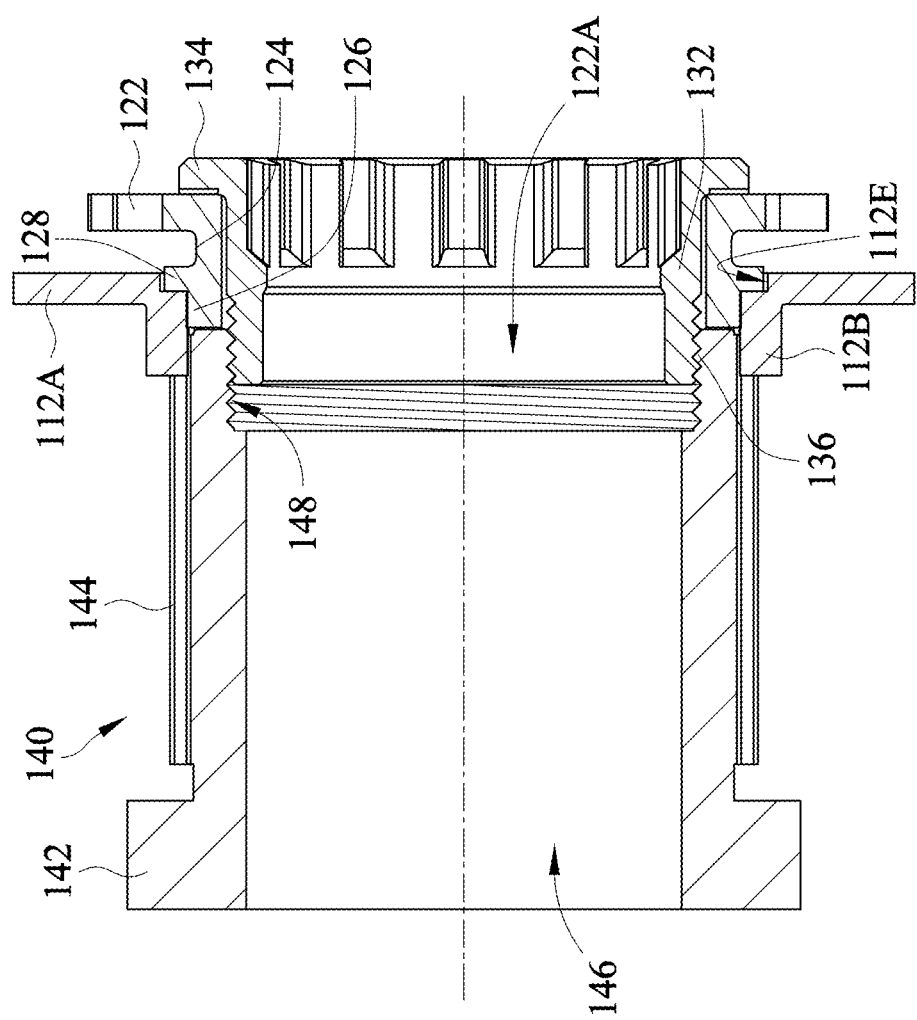
FIG. 7 illustrates a schematic cross-sectional combination view of the partial components of FIG. 6

FIG. 1 illustrates a schematic combination view of a transmission device for bicycle of the present invention. FIG. 2 illustrates a partial exploded view of the transmission device for bicycle of the present invention. FIG. 3 illustrates an exploded view of the transmission device for bicycle of the present invention. FIG. 4 illustrates a schematic view of a second sprocket of the present invention. FIG. 5 illustrates a schematic cross-sectional view of the first sprocket combined with the second sprocket of the present disclosure. FIG. 6 illustrates a schematic cross-sectional exploded view of partial components of the transmission device for bicycle. FIG. 7 illustrates a schematic cross-sectional combination view of the partial components of FIG. 6. More, FIG. 2 represents that a support body 140 is installed on a sprockets cluster 110, and FIG. 6 shows a first sprocket 112, a second sprocket 120, a lock 130, and a support body 140. Referring to FIG. 1 to FIG. 7, the transmission device for bicycle 100 has a sprockets cluster 110, a second sprockets 120 and a lock ring 130. The sprockets cluster 110 has a first sprocket 112 and other sprockets that are a sprocket 114A, a sprocket 114B, a sprocket 114C, a sprocket 114D, a sprocket 114E, a sprocket 114F, a sprocket 114G, a sprocket 114H, a sprocket 114I, and a sprocket 114J, and a number 114 is for representing a total reference number of those sprockets. Further, the first sprocket 112 is one of the sprockets cluster 110. As an embodiment, the first sprocket 112 and the sprockets 114 are connected with each other in sequence. For other embodiments, the sprockets 114 are connected with each other on the support body 140 in advance.

The first sprocket 112 has a first sprocket teeth 112A, a protrusion of first sprocket 112B and a spline of first sprocket 112C, wherein an opening of first sprocket 112D is formed in the first sprocket teeth 112A. The protrusion of first sprocket 112B protrudes from one side of the first sprocket teeth 112A. The spline of first sprocket 112C has a plurality of troughs on an inner surface of the protrusion of first sprocket 112B, and the spline of first sprocket 112C is through the first sprocket teeth 112A along an axial direction AX. That is, the whole spline of first sprocket 112C penetrates through the first sprocket teeth 112A. In other words, the spline of first sprocket 112C of the first sprocket 112 is a penetrating structure.

According to FIG. 1, the first sprocket 112 has the first sprocket teeth 112A, and both a tooth number and a diameter of the first sprocket teeth 112A are the minimum for the sprockets of the sprockets cluster 110, but is not limited thereto. Any of the sprocket 114A, the sprocket 114B, the sprocket 114C, the sprocket 114D, the sprocket 114E, the sprocket 114F, the sprocket 114G, the sprocket 114H, the sprocket 114I, and the sprocket 114J of the sprockets cluster 110 is able to replace the first sprocket 112. That is, the first sprocket 112 can be substituted for other sprockets, with different tooth numbers, of the sprockets cluster 110. For instance, both the tooth number and the diameter of the first sprocket teeth 112A are the minimum for the sprockets of the sprockets cluster 110. The tooth number of the first sprocket teeth 112A is 11, and the other tooth numbers of the sprocket 114A, the sprocket 114B, the sprocket 114C, the sprocket 114D, the sprocket 114E, the sprocket 114F, the sprocket 114G, the sprocket 114H, the sprocket 114I, and the sprocket 114J are all greater than the tooth number of the first sprocket teeth 112A. As to other embodiments, the tooth number of the first sprocket teeth 112A is greater than 11.

The second sprocket 120 has a second sprocket teeth 122, a protrusion of second sprocket 124, a plurality of splines on second sprocket 126, and an opening of second sprocket 122A, wherein the protrusion of second sprocket 124 protrudes from one side of the second sprocket teeth 122, the splines on second sprocket 126 are a plurality of bumps on an external surface of the protrusion of second sprocket 124. The opening of second sprocket 122A is a through hole to form an inner surface of the protrusion of second sprocket 124. The tooth number of the second sprocket teeth 122 is less than the tooth number of the first sprocket teeth 112A. As an example, the tooth number of the second sprocket teeth 122 is 10, and the tooth number of the first sprocket teeth 112A is 11. As to some other embodiments, the second sprocket teeth 122 which tooth number is less than 10.

Talking to the present invention, the spline on second sprocket 126 of the second sprocket 120 is disposed in the spline of first sprocket 112C of the first sprocket 112, in order to assemble the second sprocket 120 on the first sprocket 112. A lock ring 130 is disposed in the opening of second sprocket 122A of the second sprocket 120, so as to assemble the transmission device for bicycle 100. Compared to prior arts, the present invention discloses a new type of assembly structure, wherein the spline of first sprocket 112C of the first sprocket 112 is a penetrating structure. In this way, the manufacturing complexity is thus reduced, and the need for high-tonnage extrusion forging is eliminated as well. The high requirements of the parts, mold strength, and machine capability may not be necessary to produce the spline of first sprocket 112C, thereby further reducing production costs.

With reference to FIG. 3, the sprockets cluster 110 has a spline of sprockets 116. The transmission device for bicycle 100 further has the support body 140 and a rear hub 150. The rear hub 150 is connected with the support body 140, which has a seat 142, a spline of support body 144 and a hollow part 146, wherein the spline of support body 144 is connected with one side of the seat 142 and protrudes from the seat 142, and the hollow part 146 is a through hole to form an inner surface of the spline of support body 144. An internal thread 148 is adjacent to an end edge of the hollow pat 146. While in assembly, the spline of support body 144 is at the spline of sprockets 116, and one end of the spline of supported body 144 protrudes out from the spline of sprockets 116.

Please refer to FIG. 2, FIG. 3, FIG. 6, and FIG. 7, a further embodiment, that is, the lock ring 130 has a joint portion 132, a ring body 134, an external thread 136, and a hole part 138. An inner portion of the joint portion 132 is the hole part 138, and the joint portion 132 is a cylindrical hollow body, for instance. The ring body 134 is connected with one side of the joint portion 132. Besides, the diameter of the ring body 134 is greater than the diameter of the joint portion 132, and the external thread 136 is on the partial external surface of the joint portion 132. In such way, the protrusion of first sprocket 112B of the first sprocket 112 is disposed outside the spline of support body 144. The splines on second sprocket 126 of the second sprocket 120 are disposed in the spline of first sprocket 112C of the first sprocket 112, so as to combine the second sprocket 120 with the first sprocket 112. Continuously, the joint portion 132 of the lock ring 130 penetrates through the opening of second sprocket 122A of the second sprocket 120 and the hollow part 146 of the support body 140. The ring body 134 is supported by the second sprocket teeth 122. The external thread 136 of the external surface of the joint portion 132 and the internal thread 148 of the hollow part 146 of the support body 140 are mutually screwed together, in order to fasten the lock ring 130 in the support body 140.

For a further embodiment, with respect to FIG. 2, FIG. 3, FIG. 5, and FIG. 7, the first sprocket 112 has a recess 112E, which is sunk from another side of the first sprocket teeth 112A and adjacent to the spline of first sprocket 112C. The second sprocket 120 has a shoulder 128, which is a flange extending outwardly from an external side of the splines on second sprocket 126, and the shoulder 128 is against to the recess 112E while the second sprocket 120 and the first sprocket 112 are combined with each other.

Figure 8:
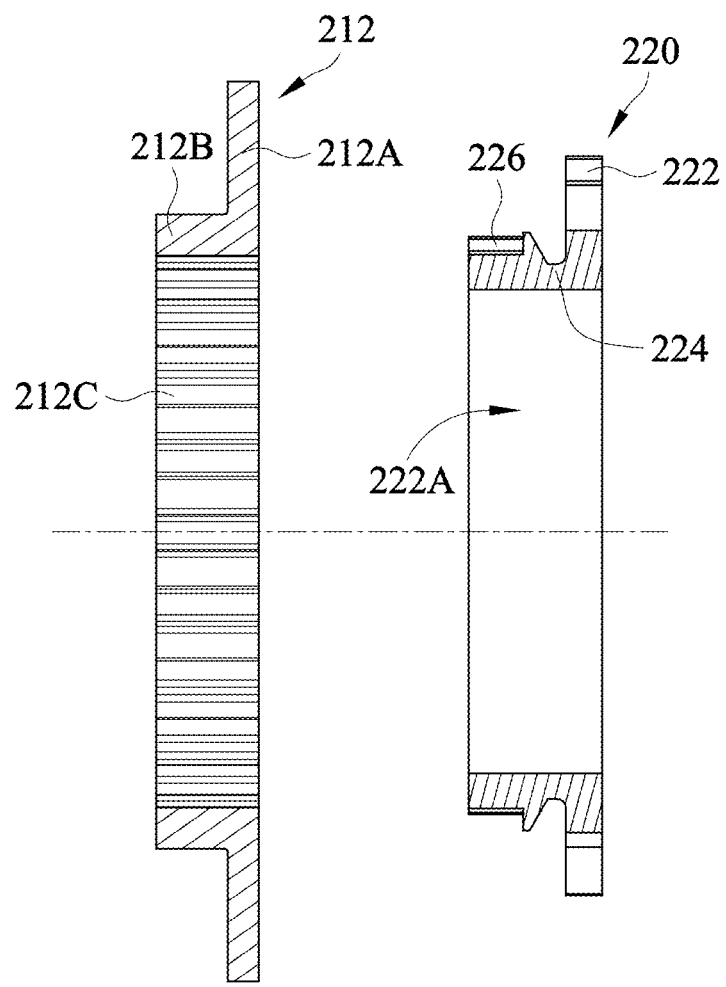
FIG. 8 illustrates a schematic exploded view of another embodiment of the first sprocket and the second sprocket of the present invention.
Figure 9:
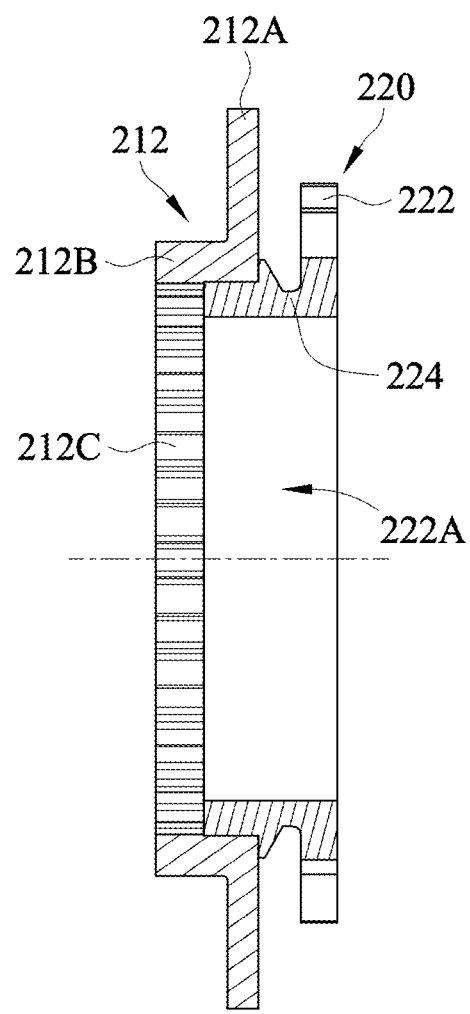
FIG. 9 illustrates a schematic cross-sectional assembled view of the embodiment of the first sprocket and the second sprocket of the present invention.

The aforesaid embodiments may not be limited thereto for the present invention. In regard to FIG. 8 and FIG. 9, which represent another embodiment of a first sprocket 212 and a second sprocket 220. The first sprocket 212 has a first sprocket teeth 212A, a protrusion of first sprocket 212B and a spline of first sprocket 212C, the protrusion of first sprocket 212B protrudes from one side of the first sprocket teeth 212A. The spline of first sprocket 212C has a plurality of troughs on an inner surface of the protrusion of first sprocket 212B, and the spline of first sprocket 212C is through the first sprocket teeth 212A. Compared the first sprocket 212 with the first sprocket 112 as aforesaid FIG. 1 to FIG. 7, the difference between them is that the first sprocket 112 is with the recess 112E, but the first sprocket teeth 212A of the first sprocket 212 has no a recess on a surface thereof. Therefore, the spline of first sprocket 212C penetrates from the surface of the first sprocket teeth 212A to a bottom surface of the protrusion of first sprocket 212B.

On the other hand, the second sprocket 220 has a second sprocket teeth 222, a protrusion of second sprocket 224, a plurality of splines on second sprocket 226, and an opening of second sprocket 222A, wherein the protrusion of second sprocket 224 protrudes from one side of the second sprocket teeth 222, the splines on second sprocket 226 are a plurality of bumps on an external surface of the protrusion of second sprocket 224, the opening of second sprocket 222A is a through hole to form an inner surface of the protrusion of second sprocket 224. Compared the second sprocket 220 with the second sprocket 120 as aforesaid FIG. 1 to FIG. 7, the difference between them is that the second sprocket 120 has the shoulder 128, but a surface of the spline on second sprocket 226 of the second sprocket 220 has no a flange extending outwardly. Hence, the spline on second sprocket 226 is disposed in the spline of first sprocket 212C of the first sprocket 212, in order to assemble the second sprocket 220 on the first sprocket 212.

As a conclusion, the present invention discloses the features as following. The spline on second sprocket of the second sprocket is disposed in the spline of first sprocket of the first sprocket, in order to assemble the second sprocket with the first sprocket. Continuously, the lock ring is disposed in the opening of second sprocket of the second sprocket, so as to fabricate the transmission device for bicycle. Compared with prior arts, the present invention provides a new type of assembly structure, the spline of the first sprocket of the first sprocket is a penetrating structure. In this way, the manufacturing complexity is thus reduced, and the need for high-tonnage extrusion forging is eliminated as well. The high requirements of the parts, mold strength, and machine capability may not be necessary to produce the spline of first sprocket, thereby further reducing production costs.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A transmission device for bicycle comprising:
   a sprockets cluster, having a plurality of sprockets, wherein one of the sprockets is a first sprocket, the first sprocket having a first sprocket teeth, a protrusion of first sprocket (112B) and a plurality of splines of first sprocket, the splines of first sprocket being a plurality of troughs on an inner surface of the protrusion of first sprocket, and the spline of first sprocket being through the first sprocket teeth along an axial direction, the protrusion of first sprocket protruding from one side of the first sprocket teeth;
   a second sprocket, having a second sprocket teeth, a protrusion of second sprocket, a plurality of splines on second sprocket, and an opening of second sprocket, wherein the protrusion of second sprocket protrudes from one side of the second sprocket teeth, the splines on second sprocket being a plurality of bumps on an external surface of the protrusion of second sprocket, the opening of second sprocket being a through hole to form an inner surface of the protrusion of second sprocket, the spline on second sprocket being disposed in the spline of first sprocket, in order to assemble the second sprocket on the first sprocket; and
   a lock ring, disposed in the opening of second sprocket.

2. The transmission device for bicycle according to claim 1, wherein a tooth number of the second sprocket teeth is less than a tooth number of the first sprocket teeth.

3. The transmission device for bicycle according to claim 1, wherein both a tooth number and a diameter of the first sprocket teeth are the minimum for the sprockets of the sprockets cluster.

4. The transmission device for bicycle according to claim 1, wherein the first sprocket has a recess, which is sunk from another side of the first sprocket teeth and adjacent to the spline of first sprocket.

5. The transmission device for bicycle according to claim 4, wherein the second sprocket has a shoulder, which is a flange extending outwardly from an external side of the splines on second sprocket and is against to the recess.

6. The transmission device for bicycle according to claim 1, wherein a tooth number of second sprocket teeth is less than or equal to 10.

7. The transmission device for bicycle according to claim 1, wherein a tooth number of the first sprocket teeth is greater than or equal to 11.

8. The transmission device for bicycle according to claim 1, wherein the sprockets are connected with each other in sequence.

9. The transmission device for bicycle according to claim 1, wherein the sprockets cluster has a spline of sprockets.

10. The transmission device for bicycle according to claim 9 further comprising a support body, which has a spline of support body disposed in the spline of sprockets, one end of the spline of support body protruding from the spline of sprockets.

11. The transmission device for bicycle according to claim 10, wherein the other sprockets are connected with each other in sequence on the support body.

12. The transmission device for bicycle according to claim 10, wherein the spline of support body engages with the spline of first sprocket of the first sprocket.

13. The transmission device for bicycle according to claim 10, wherein the support body has a seat and a hollow part, the spline of support body protruding from the seat, the hollow part being a through hole to form an inner surface of the spline of support body and having an internal thread, wherein the internal thread and an external thread of the lock ring are mutually screwed together, in order to fasten the lock ring in the support body.

* * * * *